July 9, 1957 G. B. BOOTH 2,798,972
VIBRATION PICKUP
Filed Feb. 16, 1956 2 Sheets-Sheet 1

Inventor
Galt B. Booth
By his attorneys
Howson and Howson

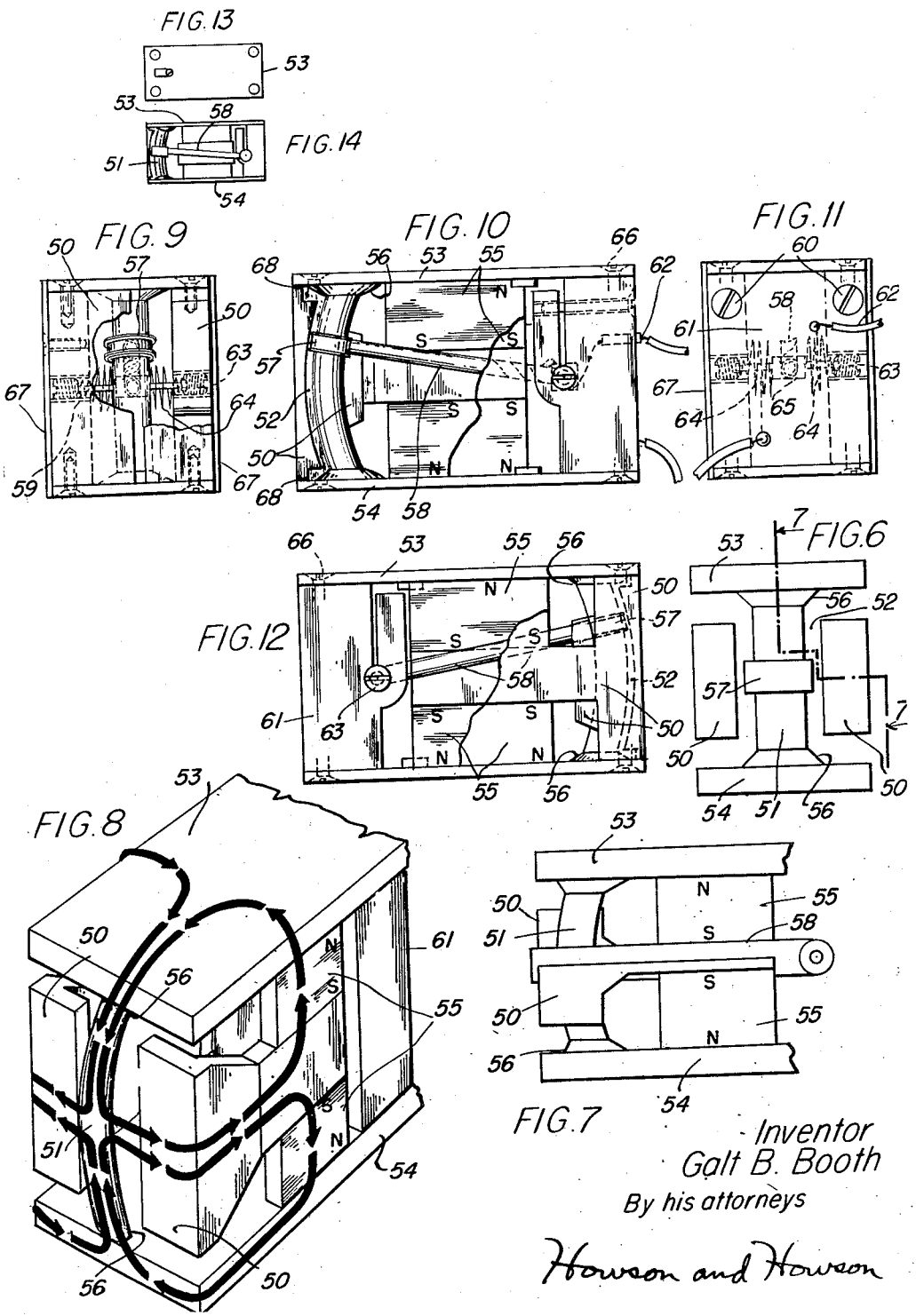

United States Patent Office
2,798,972
Patented July 9, 1957

2,798,972

VIBRATION PICKUP

Galt B. Booth, Short Beach, Conn., assignor to Textron Inc., Providence, R. I., a corporation of Rhode Island Application February 16, 1956, Serial No. 565,837

5 Claims. (Cl. 310—27)

This invention relates to a vibration pickup, i. e. an instrument which when fastened to an object under test, converts vibratory motion into electrical output. It is generally used as a seismic instrument, and it is adapted to generate a voltage proportional to a single component of the velocity of the vibrating object on which it is mounted. This voltage is generated by the motion of a small coil mounted on the end of a pivoted arm free to move in a magnetic field. The coil, moving through an air gap which is filled with the magnetic flux, cuts the lines of force, thereby inducing an electromotive force proportional to the number of lines cut. In this way the frequency and amplitude of the movement are translated into electromotive force. The object of the invention is to build a pickup of increased sensitivity and decreased size. According to the invention, this is done by means of a structure which produces higher flux densities in the air gap of the pickup. It is characteristic of pickups made in accordance with the invention that the inner pole over which the coil moves receives flux from both its ends.

In the drawings,

Fig. 6 is a diagram similar to Fig. 3, showing in front elevation the magnetic parts of a vibration pickup made in accordance with the present invention.

Fig. 7 is a diagram in side elevation of the pickup of Fig. 6, showing only the main parts, the view being taken on the line 7—7 of Fig. 6.

Fig. 8 is a schematic view in perspective similar to Fig. 5 but of a vibration pickup made in accordance with the invention, showing the improved arrangement of the parts and the new paths taken by the magnetic flux.

Fig. 9 is a view in elevation of the front of the pickup of Figs. 6, 7 and 8, with the front of the outer poles partly broken away.

Fig. 10 is a view in side elevation, partly broken away on a median line, of the pickup of Fig. 9 without any side plates.

Fig. 11 is a view in elevation from the rear of the pickup of Figs 9 and 10, showing the mounting of the coil support arm.

Fig. 12 is a view in elevation from the left side of the pickup of Figs. 9, 10, and 11, with one outer pole partly broken away as in Fig. 10.

Figs. 13 and 14 show, respectively, a top plate and a view in side elevation of the pickup of Figs. 9–12, the actual size of the pickup being shown.

Figure 1:
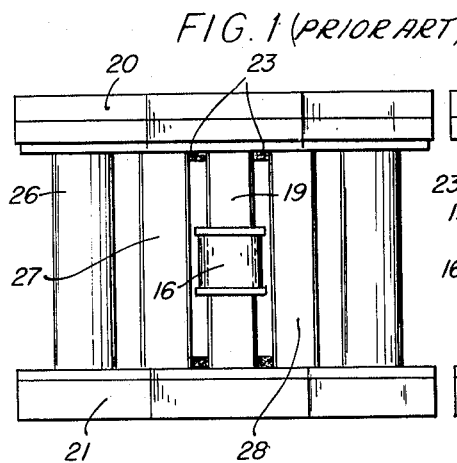
Fig. 1 is a view in elevation of the front of a typical vibration pickup of the prior art.
Figure 2:
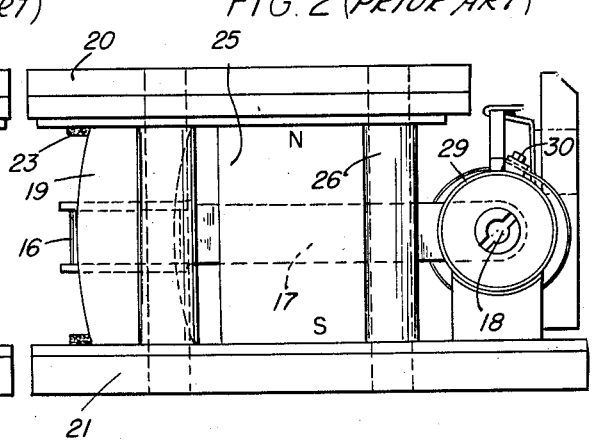
Fig. 2 is a view in side elevation of the prior art pickup of Fig. 1.

The prior art pickup of Figs. 1–5 will be described first. This is the form of prior art pickup having a magnet structure most nearly resembling the structure of the present invention. The voltage is generated by the arcuate motion of a small coil 16 mounted on the end of a support arm or shaft 17 pivoted to permit vertical movement. The moving coil is of light weight and the pivoted shaft 17 has a low friction pivot point 18 at the rear of the pickup. The coil is threaded on a magnetic inner pole 19 which is curved in accordance with its distance from the pivot point 18 (see Figs. 2 and 4). This pole is supported at its ends by top and bottom plates 20 and 21 also made of soft iron or other magnetic conductive material. The bottom plate 21 is insulated from the inner pole 19 by means of a non-magnetic spacer 22 but the top plate 20 is magnetically connnected to the inner pole. At each end of the inner pole resting on the adjacent plate are resilient stops 23 to save the coil and instrument from damage if there should be an excessive movement of the coil (see Figs. 1 and 2). There are two permanent magnets 24 and 25 located to the rear of the inner pole 19 but short of the pivot point 18 at the extreme rear of the instrument. These magnets are magnetically connected to the top and bottom plates. There are two tubes 26, one on each side of the instrument, running from the top to the bottom plate and registering with holes through the plates. These form screw holes by which the instrument can be bolted to the specimen to be tested.

Figure 3:
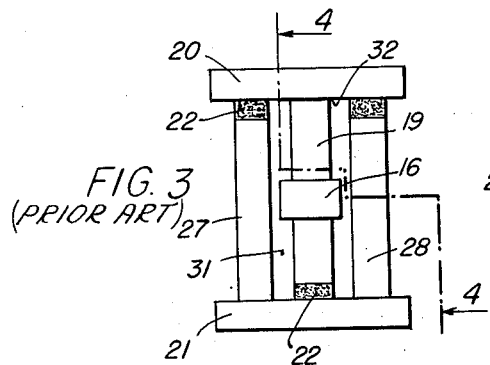
Fig. 3 is a diagram in front elevation of the three main poles at the front of the pickup of Fig. 1.
Figure 4:
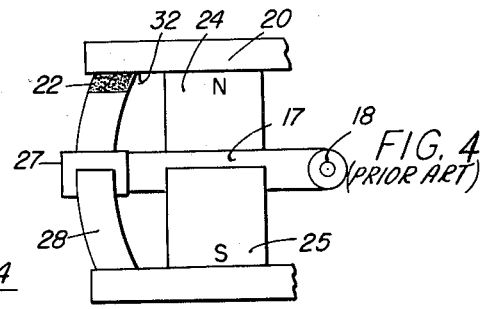
Fig. 4 is a diagram in side elevation of the main parts of the pickup of Fig. 3, taken on the line 4—4 of Fig. 3.

As can be seen from Figs. 3 and 4, there are two outside magnetic poles 27, 28 at the sides of the inner pole 19. They are each separated from the top plate by a non-magnetic spacer 22. To adjust the coil 16 in the mid-position of its travel, outside nuts 29 are loosened slightly at the pivot point 18 of the shaft 17 and spring clamp lugs 30 and associated spring reset circumferentially until the coil is in the center of its travel (see Fig. 2). The nuts 29 are then tightened.

Figure 5:
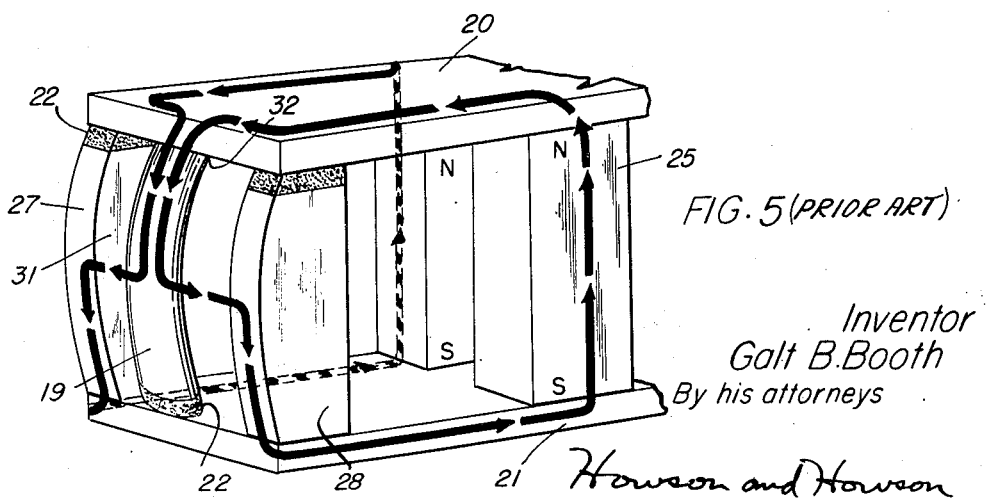
Fig. 5 is a schematic view in perspective of the stationary magnetic parts of the pickup of Figs. 1–4, showing the paths taken by the magnetic flux.

The flux follows the paths of the solid black arrows in Fig. 5. It will be seen that the flux density in the air gap 31 of this magnetic structure is limited by the saturation of the iron at the point 32 where the inner pole 19 is met by the top plate 20. This is true because all of the flux which fills the air gap is equal to the ratio of the iron area at this point to the air gap area, multiplied by the saturation flux density of the iron at that point. Assuming that the upper ends of the permanent magnets 24, 25 are north and the bottoms south, the path of travel of the flux is as follows. From the upper or north ends N of the permanent magnets the flux travels from the rear to the front of the top plate 20 through the point 32 and down the inner pole 19. Since the inner pole is insulated from the bottom plate 21, the flux passes across the air gap 31, into the two outer poles 27, 28, thence to the bottom plate 21 and back to the rear of the instrument where the flux enters the south poles S of the permanent magnets. Since the strength of the electromotive force introduced is proportional to the number of lines of flux cut by the moving coil, the frequency and amplitude of the vibration will be translated into voltage which could be increased and the instrument made more sensitive if the strength of the flux could be increased. The saturation of the iron at point 32 where the upper plate and inner pole meet limits the flux density in the air gap. It will be seen from Fig. 5 that the outer poles 27, 28 have to be insulated from one plate and the inner pole 19 from the other plate, so that there is no way of increasing the flux.

In the pickup of the present invention a new type magnet structure has been made which permits higher flux densities in the pickup air gap. Referring to Figs. 6 and 7, a complete change in the magnetic circuit has been made. In these figures, for the same pickup height the flux density is more than double the prior art magnet structures shown in Figs. 1–5. Therefore if the new magnet structure of Figs. 6–14 has the same height and air gap dimensions as the pickup of Figs. 1–5, the flux density of the present structure has double the value of the flux density of the prior art magnet structure. Instead of having one critical iron area 32 (see Fig. 5), two critical iron areas 56 are used to bring the flux to the inner pole. To achieve this the two outer poles 50 are insulated magnetically from both the upper plate 53 and the lower plate 54. Instead of being connected to one of the plates, the outer poles are connected directly to the magnets 55, each pole being located between its two magnets. One magnet has the north pole facing upwardly, and the other the south pole. The instrument thus has two permanent magnets 55 on each side, one with its north pole N attached to the top plate 53 and the other with its north pole N attached to the lower plate 54. This gives a total of four magnets. The south pole S of each magnet is at the midpoint of the instrument vertically attached to its outer pole 50. For this purpose each outer pole is shaped in the general form shown diagrammatically in Fig. 8. At the front end of the instrument, which is the end nearest the observer in the figure, each of these outside poles extends for a majority of the distance between the top and bottom plates 53, 54 but is spaced from the plates. As these outside poles 50 extend rearward, they taper down to a height of perhaps one-third the distance, or less, between the upper and lower plates. At this point they enter between the two magnets 55. It will be seen that in this way there are two magnet north poles connected to the top plate and two inverted with their north poles connected to the bottom plate, on the two sides of the instrument, and the south poles all connected to the rear ends of the outer poles. This gives two flux paths respectively leading into the inner pole at opposite ends.

This structure clears the way for connecting the inner pole 51 to both the upper plate 53 and the lower plate 54, giving the two critical iron areas 56 instead of one to supply flux to the inner pole and therefore the air gap. The resulting circulation of the flux is shown by the black arrow paths in Fig. 8. The upper permanent magnet 55 on each side of the instrument supplies lines of force to the upper plate 53, which lines then come to the front end of the instrument and pass into the inner pole 51 at the upper end. Simultaneously, the north pole of each lower magnet on the sides of the instrument is passing lines of flux into the adjacent lower plate 54, from whence the lines travel to the front of the instrument and enter the lower end of the inner pole 51. It will be seen that flux lines are entering the inner pole from the critical iron areas 56 at both the top and bottom plates, rather than at only one end as heretofore. The flux lines from both halves of the pole transfer themselves across the air gap to the outer poles 50 and thence back to the south poles of the four permanent magnets 55. It is apparent that the north and south functions of the magnets could be interchanged without changing the function of the unit.

The remainder of the instrument is constructed as follows. The moving coil 57 is carried on a support arm or pivoted shaft 58 connected to a transverse axle 59. This latter acts as the pivot point. The ends of the axle 59 rotate in bearings mounted on the inner ends of adjustment screws 63 (see Figs. 11 and 12) which are clamped by screws 60 in back post 61. There are centering springs 64 coiled about the axle 59 to maintain the pivoted shaft 58 in central position (Figs. 9 and 11). The shaft 58 is mounted on its axle by means of a block 65 between the two centering springs 64. The upper plate 53 and lower plate 54 are held to the post 61 by assembly screws 66. Insulated from the back posts are the electric wires 62 which are connected by the springs 64 to the coil circuit to carry the electromotive force built up by the coil to any analyzing instrument. The poles are curved at their front ends in accordance with the curvature of the inner pole 51 (see Fig. 10). They are insulated magnetically at point 68 from the top and bottom plates 53, 54 (see Fig. 10). Thus it will be seen that the outer poles 50 surround the inner pole on two sides and in front in a manner to give uniform distribution of the flux. Side covers 67 are provided to completely enclose the unit. They are shown on both sides in Fig. 9.

This arrangement, whereby the flux from both the bottom and top plates passes into the inner pole and thence to the outer pole means, gives an instrument which is much more sensitive than its predecessors. A smaller amplitude of movement than was required in previous pickups will produce a given voltage. This enables the instrument to measure smaller vibrations than was previously possible. It also enables the instrument to measure smaller differences in vibration. The invention also makes it possible to reduce the size of the instrument, as can be seen in Figs. 13 and 14.

What is claimed is:

1. A vibration pickup instrument adapted to convert vibratory motion into proportional electrical output comprising an inner pole, an electrical coil surrounding the inner pole, a mounting for the coil permitting it to move along the inner pole, means for transmitting the electrical output of the coil, and outer pole means on opposite sides of the inner pole and spaced therefrom to form an air gap in which the flux is adapted to be located, in combination with top and bottom plates of magnetic conductive material magnetically connected to the opposite ends of the inner pole but insulated from the outer pole means, and magnets connected to said plates and to the outer pole means; whereby flux from both the top and bottom plates passes from the inner pole to the outer pole means and a sensitive instrument is obtained.

2. A vibration pickup instrument according to claim 1 in which the magnets comprise two with one pole of like polarity connected to the top plate and two with one pole of like polarity and the same polarity as the first pair connected to the bottom plate, but with the pole of other polarity of all four magnets connected to the rear ends of the outer pole means at opposite sides of the instrument; whereby there are two flux paths respectively leading into the inner pole at the opposite ends.

3. A vibration pickup instrument according to claim 1 in which the magnets comprise two with their north poles connected to the top plate and two with their north poles connected to the bottom plate, but the south poles of all four magnets are connected to the rear ends of the outer pole means at opposite sides of the instrument; whereby there are two flux paths respectively leading into the inner pole at the opposite ends.

4. A vibration pickup instrument according to claim 1 in which the magnets comprise two with their south poles connected to the top plate and two with their south poles connected to the bottom plate, but the north poles of all four magnets are connected to the rear ends of the outer pole means at opposite sides of the instrument; whereby there are two flux paths respectively leading into the inner pole at the opposite ends.

5. A vibration pickup instrument adapted to convert vibratory motion into proportional electrical output comprising top and bottom soft iron plates having sections adjacent one end thereof composed of non-magnetic material, magnetic flux producing means mounted between the soft iron portions of the top and bottom plates, a curved inner pole secured to the soft iron portions of the top and bottom plates, outer pole means on opposite sides of said inner pole attached to non-magnetic portions of the plates but attached magnetically to the magnetic flux producing means, an electrical coil freely movable through the air gap between the inner pole and the outer pole means, a pivoted arm carrying the coil between the top and bottom plates, and means for transmitting the electrical output of the coil away therefrom; whereby the flux density in the air gap is the sum of the fluxes passing from the top and bottom plates to the inner pole means.

References Cited in the file of this patent

UNITED STATES PATENTS

| | | |
|---|---|---|
| 2,234,987 | Soller | Mar. 18, 1941 |
| 2,443,969 | Tyler | June 22, 1948 |
| 2,487,029 | Piety | Nov. 1, 1949 |